United States Patent
Puckett

(10) Patent No.: US 7,056,027 B2
(45) Date of Patent: Jun. 6, 2006

(54) BEARING FOR A ROTATABLE SHAFT SUBJECT TO THERMAL EXPANSION

(76) Inventor: Gregory L. Puckett, 2619 S. 137th East. Ave., Tulsa, OK (US) 74134

( * ) Notice: Subject to any disclaimer, the term of this patent is extended or adjusted under 35 U.S.C. 154(b) by 166 days.

(21) Appl. No.: 10/772,685

(22) Filed: Feb. 5, 2004

(65) Prior Publication Data

US 2004/0175063 A1   Sep. 9, 2004

Related U.S. Application Data

(60) Provisional application No. 60/449,190, filed on Feb. 21, 2003.

(51) Int. Cl.
  *F16C 17/02*   (2006.01)
(52) U.S. Cl. .................... 384/276; 384/215; 384/295; 384/905
(58) Field of Classification Search ................ 384/192, 384/215, 275, 276, 278, 295, 296, 905
  See application file for complete search history.

(56) References Cited

U.S. PATENT DOCUMENTS

| 527,877 A | 10/1894 | O'Neil |
| 2,515,383 A | 7/1950 | Sneva ........................... 77/62 |
| 3,206,264 A | 9/1965 | Dalzell et al. .............. 308/240 |
| 3,614,252 A | 10/1971 | Rose et al. ..................... 408/9 |
| 4,169,637 A | 10/1979 | Voitas ......................... 308/241 |
| 4,579,484 A | 4/1986 | Sullivan ....................... 408/56 |
| 4,790,672 A * | 12/1988 | Komplin ..................... 384/222 |
| 4,848,935 A | 7/1989 | Seibig et al. ................ 384/276 |
| 4,880,028 A | 11/1989 | Osburn et al. .............. 137/315 |
| 5,192,137 A * | 3/1993 | Renard ........................ 384/275 |
| 5,380,112 A | 1/1995 | Schicktanz et al. ........... 403/28 |
| 5,439,331 A | 8/1995 | Andrew et al. ................ 408/8 |
| 5,538,370 A | 7/1996 | Glenn .......................... 408/30 |
| 5,938,344 A | 8/1999 | Sabin .......................... 384/278 |
| 6,012,878 A | 1/2000 | Hicks .......................... 408/1 R |
| 6,419,139 B1 * | 7/2002 | Shibata et al. .............. 384/295 |

(Continued)

FOREIGN PATENT DOCUMENTS

CH        341 362 A      9/1959

(Continued)

OTHER PUBLICATIONS

International Search Report and Written Opinion from corresponding PCT application PCT/US02/005078 filed Feb. 20, 2004; mail date Jun. 29, 2004.

*Primary Examiner*—Thomas R. Hannon
(74) *Attorney, Agent, or Firm*—Paul H. Johnson; Gable and Gotwals

(57) ABSTRACT

A bearing for rotatably supporting a cylindrical shaft within a frame cylindrical support surface in which the shaft is subject to thermal expansion, the bearing being formed of a tubular member having opposed ends and having an axial passageway therethrough, the outer surface of the bearing member having an external circumferential rib adjacent each of the ends, each rib having an external diameter that permits the bearing member to be slideably positionable in the frame internal cylindrical support surface, the axial passageway being defined by a central bearing surface of internal diameter to rotatably receiving the shaft, the bearing surface having an axial length less than the spacing between said ribs, the bearing being deformable within elastic limits permitting the internal diameter of the bearing surface to expand to accept thermal expansion of the shaft.

20 Claims, 5 Drawing Sheets

U.S. PATENT DOCUMENTS 6,485,180 B1 * 11/2002 Mena .................. 384/222

FOREIGN PATENT DOCUMENTS

| DE | 57521 C | 7/1891 |
|---|---|---|
| DE | 903762 C | 2/1954 |
| DE | 935 520 C | 11/1955 |
| DE | 41 43 535 C2 | 4/2000 |
| JP | 03020113 | 1/1991 |
| WO | WO 99/20912 A | 4/1999 |

* cited by examiner

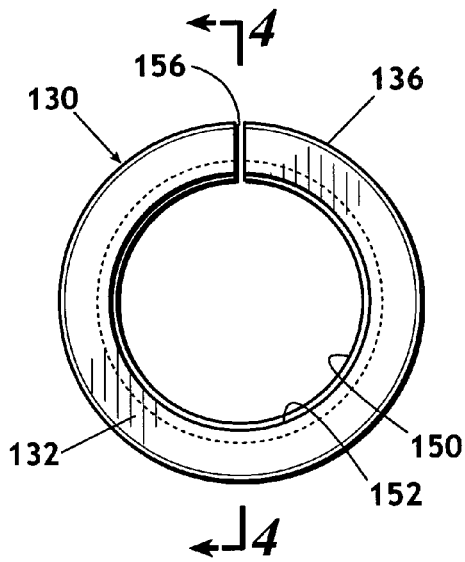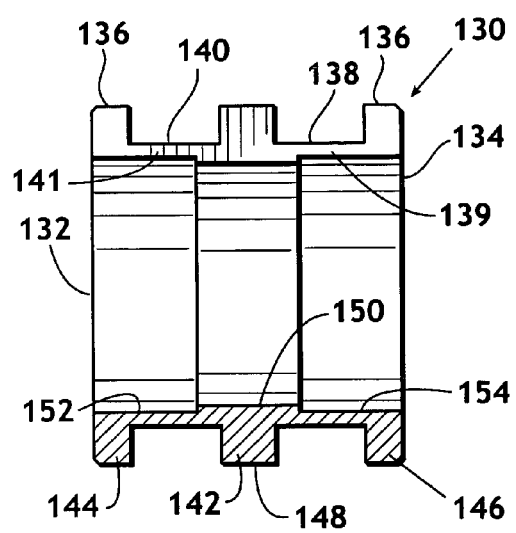
Fig. 5 Fig. 4
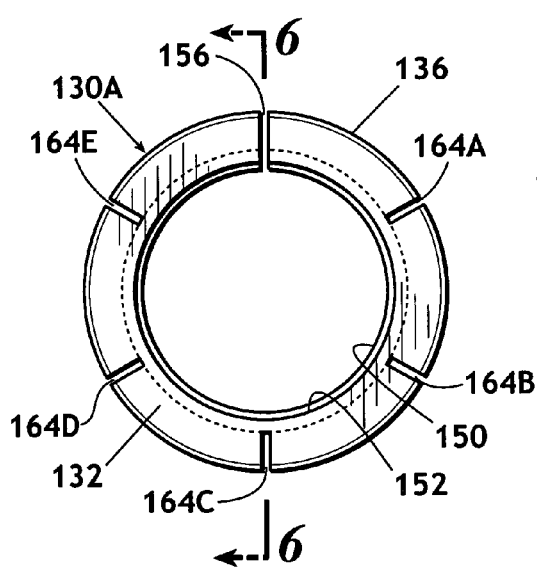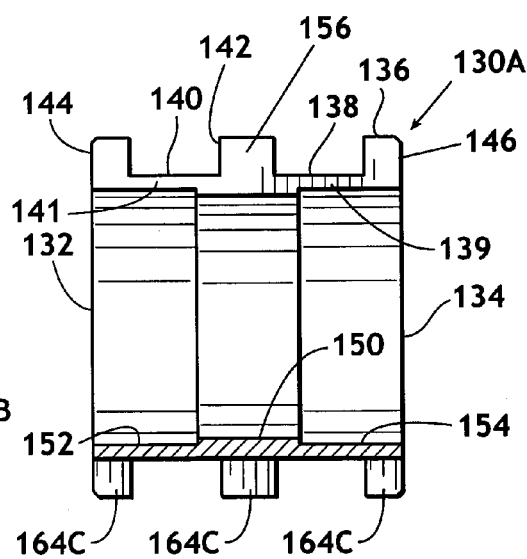
Fig. 7 Fig. 6

BEARING FOR A ROTATABLE SHAFT SUBJECT TO THERMAL EXPANSION

REFERENCE TO PENDING APPLICATIONS

This application is based on U.S. Provisional Application No. 60/449,190 entitled A HIGH TEMPERATURE TAPPING MACHINE Filed Feb. 21, 2003

REFERENCE TO MICROFICHE APPENDIX

This application is not referenced in any microfiche appendix.

FIELD OF THE INVENTION

This invention relates to a bearing for a rotatable shaft subject to thermal expansion. The bearing defined herein is particularly useful in an apparatus for tapping into a pressure vessel such as a pipeline having high temperature liquids or gases therein.

BACKGROUND OF THE INVENTION

The use of tapping machines for tapping openings in pipelines is well-known. Prior issued U.S. Pat. No. 3,614,252 entitled TAPPING APPARATUS; U.S. Pat. No. 4,579,484 entitled UNDER WATER TAPPING MACHINE; U.S. Pat. No. 4,880,028 entitled COMPLETION MACHINES; U.S. Pat. No. 5,439,331 entitled HIGH PRESSURE TAPPING APPARATUS; and U.S. Pat. No. 6,012,878 entitled PRESSURE SUBSEA TAPPING MACHINES are examples of prior issued patents relating to tapping machines. These patents are incorporated herein by reference since they provide a thorough background relating to the subject matter of the present invention.

The typical tapping machine is formed of a body which is elongated and tubular. The body has a rotating boring bar therein. The lower end of the body is provided with means, such as a flange, by which it is secured to a fitting attached to a pipeline. A gear box is affixed to the upper end of the tapping machine body and provides means for rotation of the boring bar. The lower end of the boring bar is equipped to receive a cutter. Rotative energy, such as provided by a hydraulic motor, is supplied to the gear box and this rotative force in turn is applied to rotate the boring bar.

In addition to the boring bar, the tapping machine has a feed screw for moving the boring bar axially when the boring bar is rotated relative to the feed screw. Typically, a drive sleeve rotates the boring bar to provide such relative rotation and to rotate the cutter attached to the boring bar to cause the cutter to cut a hole in a pipe. The boring bar may have either a fixed or variable feed rate depending upon the design of the tapping machine.

The tapping machine to which the present invention is particularly adaptable is basically of the previously known structures as summarized above. However, the invention herein solves a serious problem that has interfered with completely satisfactory applications of known tapping machines for tapping into a vessel, such as a pipe, having therein high temperature fluids, either liquids or gases.

The essence of the invention herein is the provision of a unique bearing design incorporated in a tapping machine to rotatably support the boring bar at the tapping machine lower end in a way that compensates for sudden temperature changes as are encountered when a boring bar drill penetrates into a vessel having high temperature liquids or gases therein. Specifically, the invention herein provides a tapping machine having as an integral part thereof, a temperature compensating bearing—that is, the bearing as employed in a high temperature tapping machine of this invention provides for temperature compensation. The unique bearing accepts thermal expansion of a boring bar whereby the bearing continually rotatably supports a boring bar under substantial temperature changes without seizing or binding upon the surface of the boring bar.

For additional background information relating to bearings, including temperature compensating bearings, reference may be had to the following previously issued United States patents:

| PATENT NO. | PUBLICATION NO. | INVENTOR | TITLE |
|---|---|---|---|
|  | 03020113 A | Kiyoshi | Thermal Expansion Absorbing Bearing |
| 527,877 |  | O'Neil | Apparatus For Tapping Mains |
| 2,515,383 |  | Sneva | Drill Jig Bushing |
| 3,206,264 |  | Dalzell et al. | High Temperature Bearings |
| 4,169,637 |  | Voitas | Drill Bushings, Pump Seals and Similar Articles |
| 4,848,935 |  | Seibig et al. | Adapter Element |
| 5,380,112 |  | Schicktanz et al. | Assembly For Concentrically Positioning A Casing Relative To A Shaft |
| 5,538,370 |  | Glenn | Device For Drilling A Square Hole |
| 5,938,344 |  | Sabin | Temperature Compensating Bearing |

BRIEF SUMMARY OF THE INVENTION

A bearing for rotatably supporting a cylindrical shaft within a frame internal cylindrical support surface is provided. The bearing is specifically adapted to support a shaft that is subject to thermal expansion. While the bearing of this invention is not limited to a specific application, it is particularly useful in a high temperature tapping machine, that is, a tapping machine designed and constructed such that it can be used to tap into a pressure vessel (most usually into a pipe) that carries high temperature gases or liquids. The bearing disclosed herein is particularly adapted for this application since tapping machines that bore into a pipeline which carries high temperature fluids, either liquids or gases, causes the boring bar to be suddenly subjected to drastic changes in temperature. That is, when a boring bar that is at ambient temperature exterior of a pipeline suddenly penetrates a pipeline the temperature at the lower end of the boring bar dramatically increases. In the past, problems have been experienced with the use of high temperature tapping machines. Specifically, the bearing that supports a tapping machine boring bar, has, on some occasion, been unable to accept the expansion of the boring bar when a pipe carrying high temperature liquids or gases is penetrated causing the bearing to seize the boring bar, preventing it rotation.

The bearing that overcomes this problem, and that is useful for other similar applications, is a tubular member having opposed ends spaced apart by distance D. The tubular member has an axial passageway therethrough. The outer surface of the tubular member has an external rib adjacent each end, the ribs being thereby spaced apart by a selected distance. Each rib has an external diameter substantially that of the internal diameter of the cylindrical support surface so that the tubular bearing member is slidably positioned within the cylindrical support surface.

The tubular bearing member axial passageway is defined by a central bearing surface of a nominal internal diameter substantially that of the nominal external diameter of the cylindrical shaft that it supports. When the bearing is used in a high temperature tapping machine this cylindrical shaft is commonly referred to as the "boring bar". The length of the central bearings surface is less than the spacing between the external ribs. The bearing is deformable within elastic limits which permits the bearing surface to expand to accept thermal expansion of the shaft.

In a preferred arrangement, the tubular bearing member has a longitudinal slit therein, the slit extending from the outer surface to the axial passageway.

In an alternate embodiment the tubular member has an intermediate external rib spaced between the opposed ribs that are adjacent the ends of the member, the intermediate rib having a nominal external diameter that is less than the internal diameter of the cylindrical support surface.

In another alternate embodiment the tubular member has at least one full depth slot in a plane parallel the bearing member tubular axis and of a length less than the length of the tubular member, the ends of the full depth slot being displaced inwardly from the opposed ends of the tubular member.

BRIEF DESCRIPTION OF THE DRAWINGS

FIGS. 1, 2 and 3 are representative of prior and indicative of an environment in which the bearing of this invention may be employed.

FIG. 4 is a cross-sectional view of a bearing that incorporates the principals of this invention.

FIG. 5 is an end view of the bearing of FIG. 4.

FIG. 6 is a cross-sectional view of a first alternate embodiment of the bearing of this invention.

FIG. 7 is an end view of the embodiment of FIG. 6.

Figure 1:
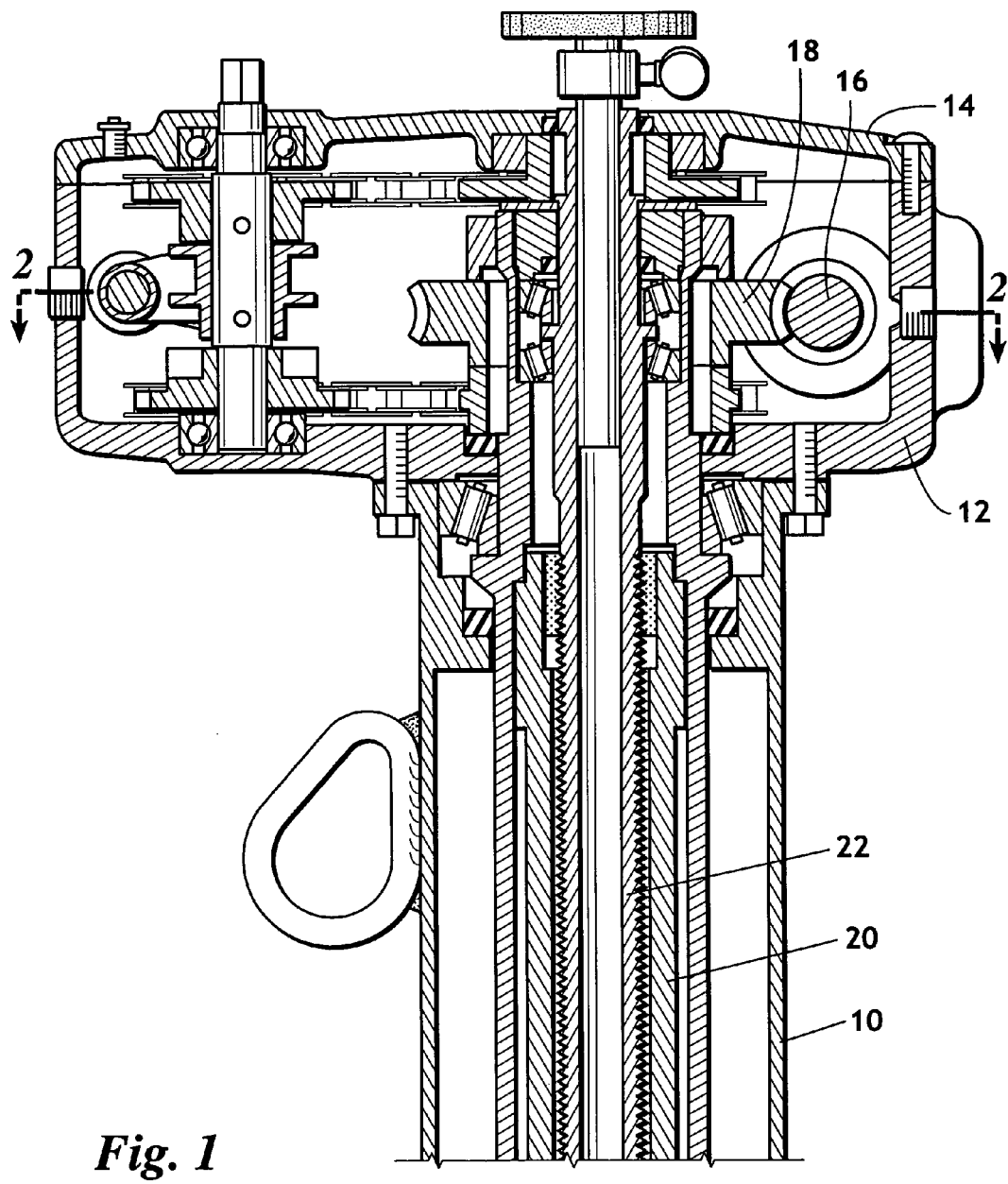
FIG. 1 is a cross-sectional view of the upper portion of a typical tapping machine, which may also be called a "boring machine," such as of the type described in U.S. Pat. Nos. 4,579,484; 5,439,331 and 6,012,878. The bearing of this invention is particularly adapted to be used in this kind of tapping machine.

| DESIGNATION OF ELEMENTS ILLUSTRATED IN THE DRAWINGS | |
|---|---|
| 10 | upper frame |
| 12 | gear case |
| 14 | gear case cover |
| 16 | worm gear shaft |
| 18 | sprocket |
| 20 | boring bar |
| 22 | feed screw |
| 24 | lower frame |
| 26 | flange |
| 28 | cylindrical openings |
| 30 | bearing |
| 130 | bearing |
| 132 | first end face |
| 134 | second end face |
| 136 | outer cylindrical surface |
| 138 | first circumferential channel |
| 139 | first tubular web portion |
| 140 | second circumferential channel |
| 141 | second tubular web portion |
| 142 | center rib |
| 142A | wide center rib |
| 144 | first cylindrical rib |
| 146 | second cylindrical rib |
| 148 | cylindrical surface of center rib |
| 150 | central circumferential surface |
| 152 | first internal circumferential surface |
| 154 | second internal circumferential surface |
| 156 | slit |
| 158 | outer circumferential groove |
| 160 | lubrication hole |
| 164A-E | shallow depth slots |
| 166A-C | full depth slots |

DETAILED DESCRIPTION OF PREFERRED EMBODIMENTS OF THE INVENTION

Figure 2:
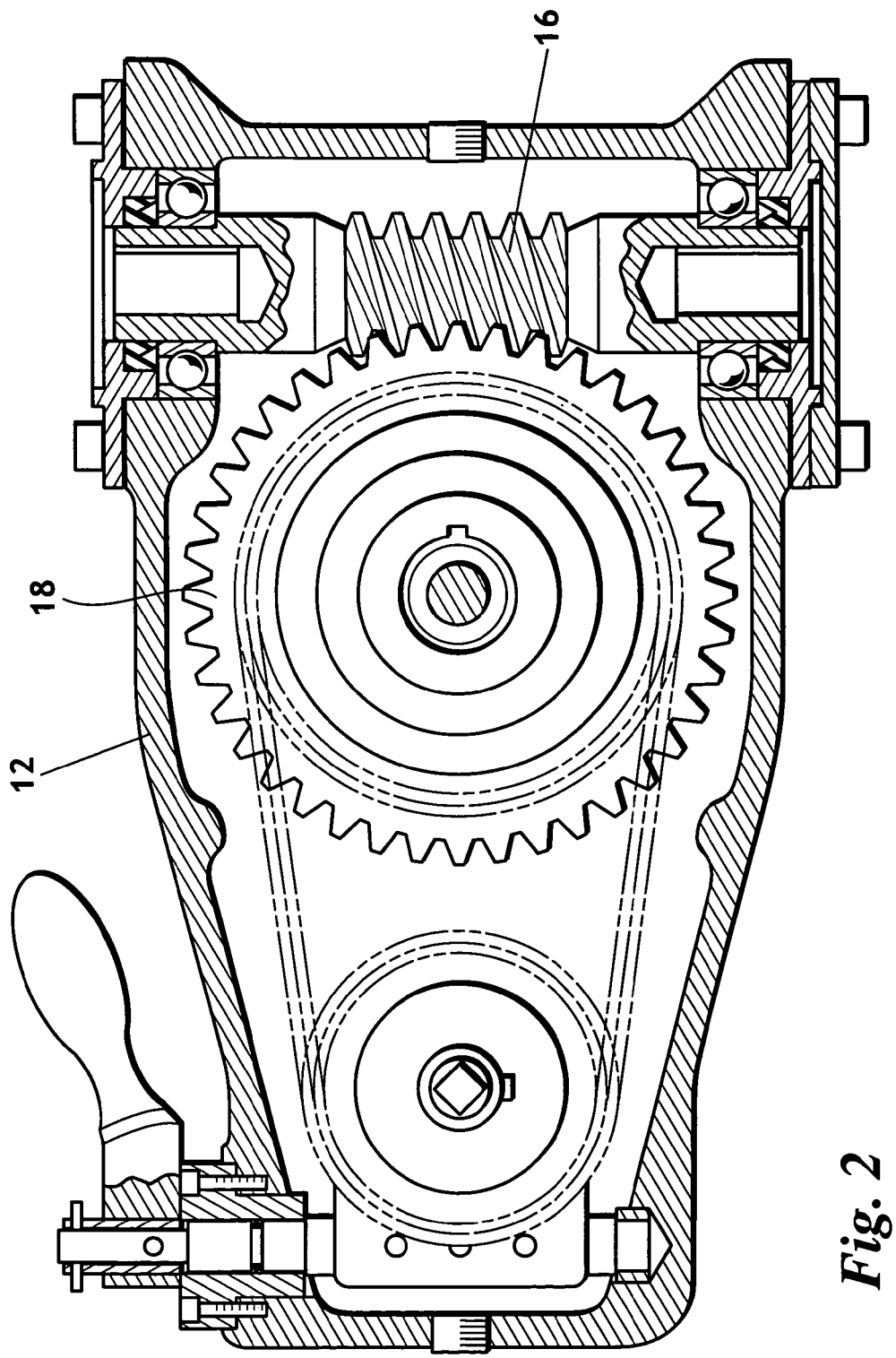
FIG. 2 is a cross-sectional view taken along the Line 2—2 of FIG. 1 showing the arrangement whereby rotative power is supplied for rotating a boring bar in the tapping machine.
Figure 3:
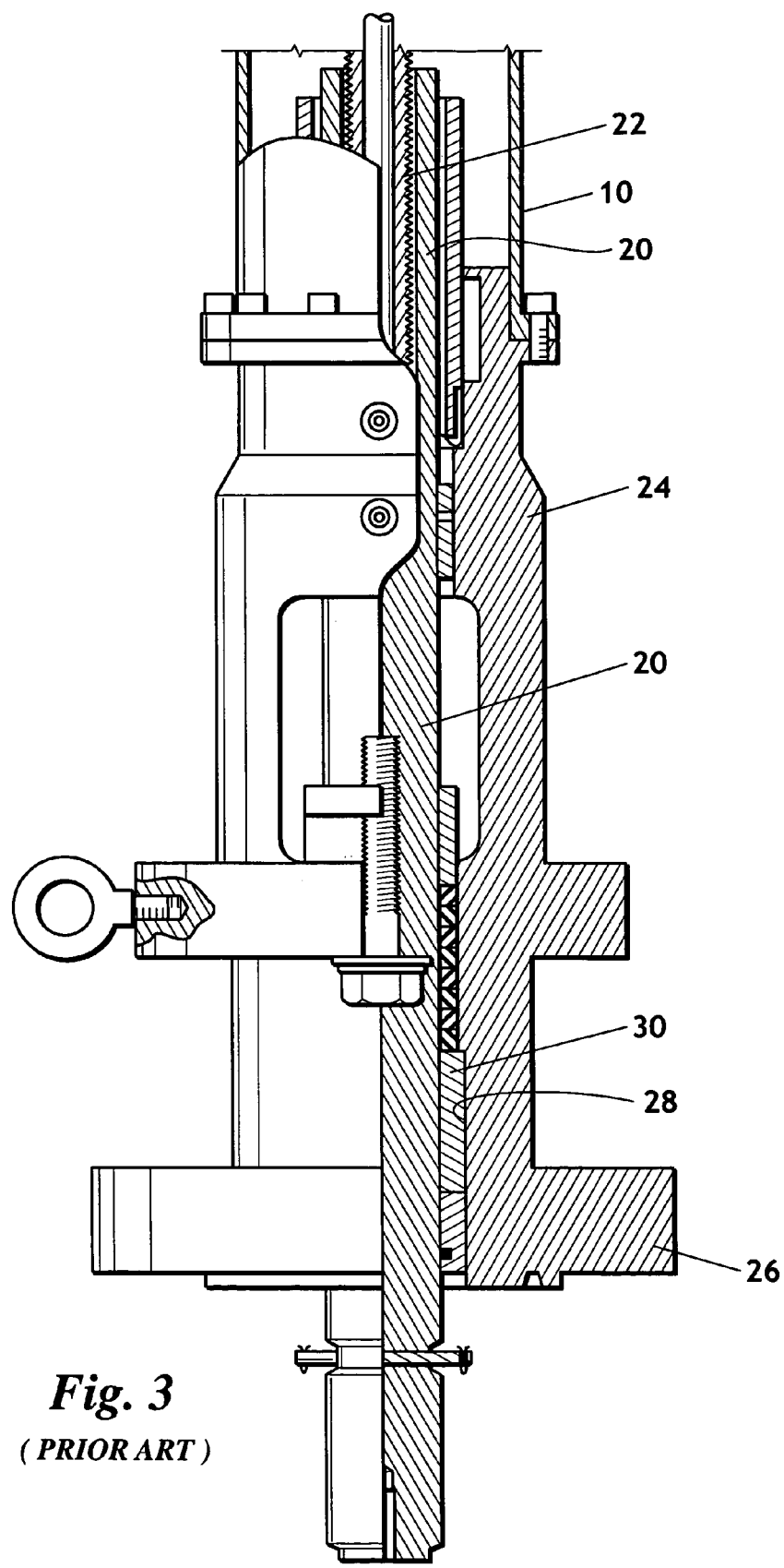
FIG. 3 is a fragmentary, partial cross-sectional view of the lower portion of the tapping machine illustrated in FIGS. 1 and 2. The essence of the invention is an improved bearing for rotatably supporting the tapping machine boring bar.

As previously noted, the use of a tapping machine for tapping into a vessel such as a pipeline, and particularly a vessel that is under pressure, is well-known in the industry and is exemplified by U.S. Pat. Nos. 4,579,484; 5,439,331 and 6,012,878. A typical design of a tapping machine adapted to tap into a vessel especially a pipeline, is illustrated in FIGS. 1–3. The essence of the invention herein is an improved bearing that can be used in such existing tapping machines that facilitates tapping into pipes that carry high temperature fluids—that is, either high temperature gases or liquids.

FIGS. 1, 2 and 3 illustrate the basics of a tapping machine and are taken from U.S. Pat. No. 5,439,331 entitled: "High Pressure Tapping Apparatus. The teachings of this patent are incorporated herein by reference. FIGS. 1, 2 and 3 are included to illustrate a typical environment in which the unique bearing concepts of this invention may be successfully employed.

FIGS. 1 and 2 illustrate the upper portion of a tapping machine that includes an upper frame 10 having, at the top thereof, a gear case 12 closed by a gear case cover 14. A worm gear shaft 16 receives rotary power from a prime mover, such as a hydraulic or electric motor, not shown. Worm gear 16 drives a sprocket 18 which indirectly drives a boring bar 20. A threaded feed screw 22 controls the axial advancement and retraction of boring bar 20.

FIG. 3 shows the lower end of the typical tapping machine. Secured to the bottom end portion of upper frame 10 is a lower frame 24 having a flange 26 by which the tapping machine is removably secured to other components of a tapping assembly. Boring bar 20 extends below flange 26 and is adapted to receive a cutter (not shown) by which a hole can be cut into the wall of a pipe on other vessel. When a pipe or other vessel is penetrated by a cutter the lower end portion of boring bar 20 is suddenly subject to the temperature of the fluid, either liquid or gas, being carried by the pipe or other vessel. Therefor, the boring bar 20 is subject to a wide range of temperatures.

Supported within a cylindrical opening 28 within lower frame 24 is a bearing 30 that rotatably supports boring bar 20. Bearing 30, shown diagrammatically in FIG. 3, is representative of the environment in which the bearing of this invention may be employed.

In the past, when a tapping machine was utilized for tapping into a high temperature environment a problem existed in that the application of high temperature frequently caused the boring bar (element 20 in FIGS. 1–3) to increase in diameter due to thermal expansion to the point that it was seized by the bearing 30 by which it was rotatably supported. This invention provides a unique bearing that overcomes this problem. Specifically, the invention herein provides an integral spring-loaded bearing that supports the rotating boring bar 20 and accepts expansion of the boring bar when it is subjected to high temperatures.

A first concept of the unique support bearing of this invention is illustrated in FIGS. 4 and 5, the bearing being identified generally by the numeral 130. While the support device 130 is called a bearing, it is in effect a bushing—that is, it does not include any moving parts and does not employ balls or rollers as is frequently employed in a typical "bearing." The element 130 will be referred to as a bearing, but it could equally as well be referred to as a bushing.

The bearing 130 is cylindrical, having opposed first and second end faces 132 and 134. Bearing 130 has an outer cylindrical surface 136. In the illustrated arrangement, the outer cylindrical surface is interrupted by a first circumferential channel 138 and a second circumferential channel 140. The circumferential channels 138 and 140 are separated by a circumferential central rib 142. At the bottoms of circumferential channels 138 and 140 tubular web portions 139 and 141 are formed.

Outer cylindrical surface 136 is defined by a first cylindrical rib 144 at first end face 132 and a second cylindrical rib 146 at second end face 134. Center rib 142 has a cylindrical surface 148 that is of a diameter slightly less than the diameter of first and second cylindrical ribs 144 and 146.

Bearing 130 has an interior opening therethrough defined by a first central interior circumferential surface 150 and by opposed lateral internal circumferential surfaces 152 and 154. The internal diameter of lateral circumferential surfaces 152 and 154 is slightly greater than the internal diameter of central circumferential surface 150.

As seen in the end view of FIG. 5, tubular bearing 130 has a longitudinal slit 156 that extends the full length between ends 132 and 134. Slit 156 allows the bearing to circumferentially enlarge or contract when subjected to changing temperatures.

Figure 10:
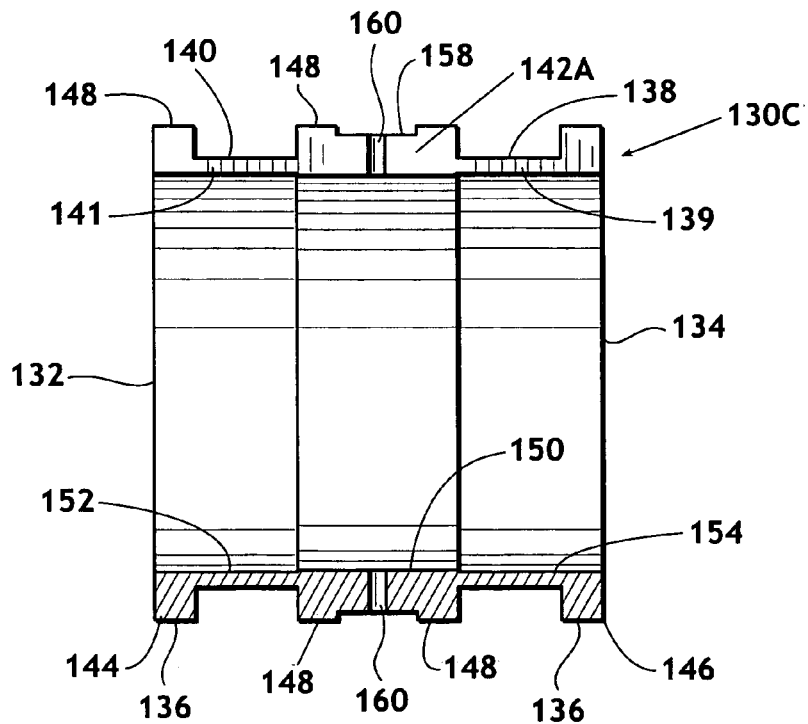
FIG. 10 is a cross-sectional view of a third alternate embodiment of the bearing.

FIG. 10 illustrates a bearing 130C of somewhat alternate design in that the center rib 142A is wider than center rib 142 as illustrated in FIG. 4. A wide, flat outer circumferential groove 158 is formed in the wide center rib cylindrical surface 148. In addition two opposed radial lubrication holes 160 are provided in the bearing of FIG. 10.

Representative dimensions of bearing 130 as illustrated in FIGS. 4 and 5 will be given for purposes of example only.

The outer cylindrical surfaces 136 of ribs 144 and 146 may be of a diameter of 3.124 (all dimensions will be inches) while the diameter of cylindrical surface 148 of center rib 142 may be of a diameter of 3.104. Thus, there is a difference of 0.02 of an inch in the diameter of center rib 142 as compared to the ribs 144 and 146. This decreased diameter of the center rib allows the interior portion of the bearing to flex or expand within elastic limits to compensate for the force of an expanding boring bar against center circumferential surface. 150.

The diameter of internal circumferential surfaces 152 and 154 may be 2.502 while the diameter of internal central circumferential surface 150 is 2.482—that is, 0.02 inches greater. This means that in normal operation only the center circumferential surface 150 engages the exterior surface of a boring bar. (The boring bar is not shown in FIGS. 4–10). When a boring bar is subjected to high temperature fluids and expands in diameter this force is applied against center circumferential surface 150. The bearing flexes outwardly (within elastic limits) to compensate for the increased external diameter of the boring bar by the fact that the cylindrical surface 148 of center rib 142 is less of diameter than that of cylindrical opening 28 (see FIG. 3) of the tapping machine lower frame 24. The length of central circumferential surface 150 is preferably about one-third of the spacing between circumferential ribs 144 and 146.

Thus, it can be seen that bearing 130 is uniquely designed to flex to accommodate a thermally expanding boring bar.

FIGS. 6 and 7 show a first alternate concept that includes the provisions of shallow depth full length slots 164A–164E that extend only through cylindrical ribs 144, 142 and 146 in bearing 130A. If this technique is applied to the embodiment of the bearing as shown in FIG. 10, the shallow depth slots 164A–164E would extend through the full width of wide center rib 142A. These shallow depth slots allow improved flexure of the bearing within its elastic limits to facilitate temperature compensation.

Figure 9:
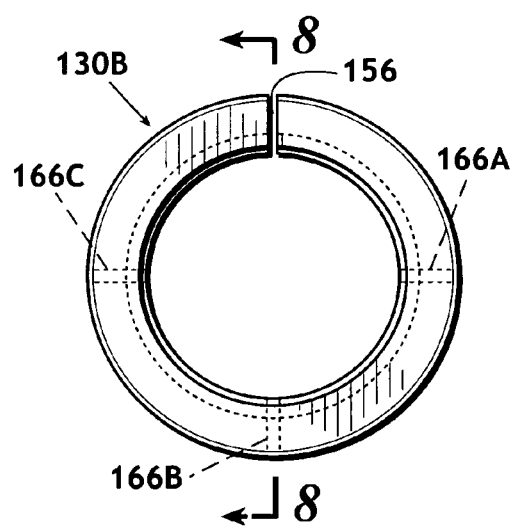
FIG. 9 is an end view of the embodiment of FIG. 8.
Figure 8:
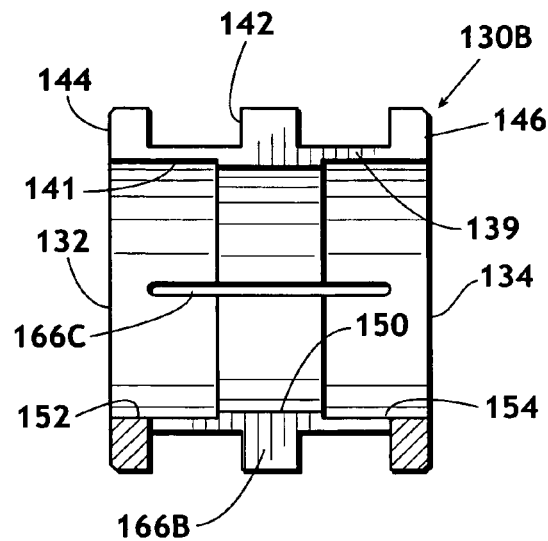
FIG. 8 is a cross-sectional view of a second alternate embodiment of the bearing.

FIGS. 8 and 9 show a second alternate concept. In this embodiment there are three slots 166A–166C formed in bearing 130B. Slots 166A–166C do not extend the full length of the bearing and do not extend through first and second cylindrical ribs 144 and 146. However, slots 146A–146C do extend the full depth of the bearing. These full depth slots 166A–166C increase the flexure of the bearing within its elastic limits.

The unique bearing as illustrated and described herein has these advantages: 1) longitudinal slit 156 (which is optional) allows the bearings to circumferential contract and expand throughout its entire length in response to temperature changes such as in response to changes in the external diameter of a boring bar; 2) the reduced external diameter of the center rib 142 (which is optional) allows the center portion of the bearing to flex in response to increased boring bar temperatures; 3) circumferential channels 138 and 140 in the external surface of the bearing reduce stiffness of the bearing; 4) circumferential channels 138 and 140 allow a central radial spring effect (within elastic limits) to allow the bearing to compensate for temperature changes of a boring bar that it rotatably supports; 5) the center rib 142 is relatively narrow in length compared to the overall length of the bearing to permit radial expansion of the central portion of the bearing to accommodate the increase in external diameter of a boring bar in response to temperature changes; and 6) the width and thickness of the center rib 142 in conjunction with the thickness and length of the webs 139 and 141 defines the spring rate of the bearing.

While the invention has been described with a certain degree of particularity, it is manifest that many changes may be made in the details of construction of the invention. It is understood that the invention is not limited to the specific embodiment set forth herein but is limited only by the scope of the claim or claims attached, including the full range of equivalency thereof.

What is claimed is:

1. A bearing for rotatably supporting a cylindrical shaft within a frame internal cylindrical support surface in which the shaft has an external diameter of A and is subject to thermal expansion and the frame internal cylindrical support surface has an internal diameter of B, comprising:

a tubular member having opposed ends spaced apart by a distance D and having an axial passageway there through, the outer surface of the member having an external rib adjacent each said end, each rib having an external diameter of B, the tubular member being slideably positionable in the frame internal cylindrical support surface, the said axial passageway being defined by a central bearing surface of internal diameter of A and rotatably receiving the shaft, the bearing surface having an axial length less than D and less than the spacing between said ribs, the bearing being deformable within elastic limits permitting the internal diameter of said bearing surface to expand to accept thermal expansion of the shaft, the member having a longitudinal slit therein extending between said opposed end and from said outer surface to said axial passageway.

2. A bearing according to claim 1 wherein said bearing surface is of axial length of about ⅓D.

3. A bearing according to claim 1 wherein said axial passageway is further defined by lateral internal circumferential surface extending from opposed ends of said center bearing surface to said member opposed ends, the internal diameter of each lateral internal circumferential surface being greater than A.

4. A bearing according to claim 1 including at least one radial lubrication hole extending from said external surface to said bearing surface.

5. A bearing according to claim 1 wherein said member has an external center rib positioned between said ribs adjacent said member ends, the center rib having an outer circumferential surface having external diameter less than B.

6. A bearing according to claim 5 wherein said center rib has a circumferential groove in said outer circumferential surface thereof.

7. A bearing according to claim 1 including at least one shallow depth supplemental slot in each said external rib.

8. A bearing according to claim 7 wherein the depth of each supplemental slot is substantially equal to the height of said external ribs.

9. A bearing according to claim 7 including a plurality of shallow depth supplemental slots in each said external rib, the supplemental slots being spaced in radial planes of a tubular axis of the member.

10. A bearing according to claim 1 including at least one full depth slot therein of length less than D and extending from said outer circumferential surface to said axial passageway.

11. A bearing according to claim 10 wherein the length of each said full depth slot is about the spacing between said external ribs.

12. For supporting a rotatable cylindrical shaft that is subject to thermal expansion, a bearing comprising:

an elongated tubular member having opposed ends and supported at spaced apart external locations and having a shaft receiving axial passageway therethrough, a relatively short length reduced internal diameter cylindrical bearing surface within said passageway and positioned intermediate to and spaced inwardly from each of said support locations, the bearing surface being radially flexible within elastic limits of the tubular member in response to changes in the diameter of the rotatable shaft, the tubular member having a full depth longitudinal slit therein extending between the opposed ends in an axial plane.

13. A bearing according to claim 12 wherein said bearing surface is of axial length of about ⅓ the distance between the spaced apart external locations.

14. A bearing according to claim 12 including at least one radial lubrication hole extending from exterior of the tubular member to said bearing surface.

15. A bearing according to claim 12 including an external circumferential rib at each of said spaced apart locations.

16. A bearing according to claim 15 wherein said tubular member has an intermediate external rib spaced between said ribs adjacent said spaced apart locations, the intermediate rib having an external diameter less the external diameter of each of said first mentioned external circumferential ribs.

17. A bearing according to claim 16 wherein said intermediate rib has a circumferential groove in an outer circumferential surface thereof.

18. A bearing according to claim 15 including at least one shallow depth slot in each said external rib.

19. A bearing according to claim 18 wherein the depth of each said slot is substantially equal to the height of said external circumferential ribs.

20. A bearing according to claim 15 including a plurality of shallow depth supplemental slots in each said external rib, the supplemental slots being spaced in radial planes of a tubular axis of the member.

* * * * *